US012693994B2

(12) United States Patent
Buchanan et al.

(10) Patent No.: US 12,693,994 B2
(45) Date of Patent: **\*Jul. 28, 2026**

(54) METHOD FOR REDUCING FALSE-POSITIVES FOR IDENTIFICATION OF DIGITAL CONTENT

(71) Applicant: CYACOMB LIMITED, Edinburgh (GB)

(72) Inventors: William Johnston Buchanan, Edinburgh Lothian (GB); Owen Chin Wai Lo, Edinburgh Lothian (GB); Philip Penrose, Keith Aberdeen (GB); Richard Macfarlane, Edinburgh Lothian (GB); Ian Stevenson, Edinburgh Lothian (GB); Bruce Ramsay, Edinburgh Lothian (GB)

(73) Assignee: CYACOMB LIMITED, Edinburgh (GB)

( \* ) Notice: Subject to any disclaimer, the term of this patent is extended or adjusted under 35 U.S.C. 154(b) by 131 days.

This patent is subject to a terminal disclaimer.

(21) Appl. No.: 18/369,351

(22) Filed: Sep. 18, 2023

(65) Prior Publication Data

US 2024/0004964 A1     Jan. 4, 2024

Related U.S. Application Data

(63) Continuation of application No. 16/500,736, filed as application No. PCT/GB2018/050617 on Mar. 12, 2018, now Pat. No. 11,762,959.

(30) Foreign Application Priority Data

Apr. 3, 2017     (GB) ...................................... 1705334

(51) Int. Cl.
*G06F 21/56*          (2013.01)
*G06F 16/14*          (2019.01)
(Continued)

(52) U.S. Cl.
CPC ............ *G06F 16/152* (2019.01); *G06F 21/10* (2013.01); *G06F 21/56* (2013.01); *G06F 21/564* (2013.01);
(Continued)

(58) Field of Classification Search
CPC .... G06F 16/152; G06F 21/10; G06F 21/6227; G06F 21/6272; G06F 21/64;
(Continued)

(56) References Cited

U.S. PATENT DOCUMENTS 7,640,589 B1 \* 12/2009 Mashevsky ............. G06F 21/56
                                                                726/25
7,984,304 B1 \*  7/2011 Waldspurger ......... G06F 12/023
                                                                717/124
(Continued)

FOREIGN PATENT DOCUMENTS

GB          2483246 A       3/2012
JP        2003167970 A      6/2003
(Continued)

OTHER PUBLICATIONS

Neil Youngman, "Fine-tuning SpamAssassin", Aug. 2004, obtained online from <https://linuxgazette.net/105/youngman.html>, retrieved on May 3, 2025. (Year: 2004).\*
(Continued)

*Primary Examiner* — Zhimei Zhu
(74) *Attorney, Agent, or Firm* — CANTOR COLBURN LLP

(57) ABSTRACT

Many areas of investigation require searching through data that may be of interest. In a first method step, a digital content element is provided. The digital content element may have any suitable format or data structure of interest to a searching entity. The digital content element may be a particular data file that is of interest to a searching entity. In
(Continued)

a second step, the digital content element is compared with a first set of data provided by a combination of a second set of data and a third set of data. The first set of data is a collection of known digital content elements that are of interest to a searching entity, for example contraband digital content elements or digital content elements owned by or represented by the searching entity. In a third method step, the digital content element is identified as known if the digital content element is detected within the first set of data.

20 Claims, 7 Drawing Sheets

(51) Int. Cl.
　　*G06F 21/10*　　　　(2013.01)
　　*G06F 21/62*　　　　(2013.01)
　　*G06F 21/64*　　　　(2013.01)
(52) U.S. Cl.
　　CPC ...... *G06F 21/6227* (2013.01); *G06F 21/6272* (2013.01); *G06F 21/64* (2013.01)
(58) Field of Classification Search
　　CPC ...... G06F 21/552; G06F 21/56; G06F 21/564; G06F 2218/00; H04W 12/128; G11B 20/00086
　　See application file for complete search history.

(56) References Cited

U.S. PATENT DOCUMENTS

| | | | | |
|---|---|---|---|---|
| 8,375,450 | B1 * | 2/2013 | Oliver | G06F 21/564 |
| | | | | 713/181 |
| 8,561,180 | B1 * | 10/2013 | Nachenberg | G06F 21/562 |
| | | | | 726/22 |
| 8,621,625 | B1 * | 12/2013 | Bogorad | G06F 21/562 |
| | | | | 713/165 |
| 8,826,444 | B1 * | 9/2014 | Kalle | H04N 21/6175 |
| | | | | 709/224 |
| 8,990,944 | B1 * | 3/2015 | Singh | G06F 21/53 |
| | | | | 726/24 |
| 9,858,413 | B1 * | 1/2018 | Zuo | G06F 21/56 |
| 10,032,023 | B1 * | 7/2018 | Kuo | G06F 21/566 |
| 10,193,902 | B1 * | 1/2019 | Caspi | G06F 21/564 |
| 2002/0082837 | A1 | 6/2002 | Pitman et al. | |
| 2002/0116195 | A1 | 8/2002 | Pitman et al. | |
| 2006/0206935 | A1 * | 9/2006 | Choi | H04L 63/1416 |
| | | | | 726/22 |
| 2007/0083757 | A1 * | 4/2007 | Nakano | G06F 21/10 |
| | | | | 713/168 |
| 2007/0226799 | A1 * | 9/2007 | Gopalan | H04L 63/145 |
| | | | | 726/23 |
| 2007/0226801 | A1 * | 9/2007 | Gopalan | H04L 63/145 |
| | | | | 726/24 |
| 2007/0226802 | A1 * | 9/2007 | Gopalan | H04L 63/1416 |
| | | | | 726/24 |
| 2007/0240222 | A1 | 10/2007 | Tuvell et al. | |
| 2008/0040807 | A1 | 2/2008 | Lu et al. | |
| 2008/0104186 | A1 * | 5/2008 | Wieneke | H04L 51/212 |
| | | | | 709/206 |
| 2008/0168558 | A1 * | 7/2008 | Kratzer | G06F 21/55 |
| | | | | 726/23 |
| 2008/0256647 | A1 | 10/2008 | Kim et al. | |
| 2010/0030722 | A1 * | 2/2010 | Goodson | G06Q 10/06393 |
| | | | | 706/54 |
| 2010/0082811 | A1 * | 4/2010 | Van Der Merwe | |
| | | | | G06F 16/9535 |
| | | | | 709/225 |
| 2011/0083176 | A1 * | 4/2011 | Martynenko | G06F 21/56 |
| | | | | 726/13 |
| 2011/0126286 | A1 * | 5/2011 | Nazarov | G06F 21/564 |
| | | | | 726/24 |
| 2011/0173698 | A1 * | 7/2011 | Polyakov | G06F 11/0748 |
| | | | | 726/23 |
| 2012/0310994 | A1 * | 12/2012 | Wionzek | G06F 16/904 |
| | | | | 707/E17.005 |
| 2012/0324579 | A1 * | 12/2012 | Jarrett | G06F 21/564 |
| | | | | 726/24 |
| 2013/0139265 | A1 * | 5/2013 | Romanenko | G06F 21/561 |
| | | | | 726/24 |
| 2013/0179995 | A1 | 7/2013 | Basile et al. | |
| 2014/0223566 | A1 * | 8/2014 | Zaitsev | G06F 21/567 |
| | | | | 726/24 |
| 2014/0280155 | A1 * | 9/2014 | Elliot | G06F 16/35 |
| | | | | 707/737 |
| 2016/0164901 | A1 * | 6/2016 | Mainieri | H04L 63/1441 |
| | | | | 726/23 |
| 2017/0180394 | A1 * | 6/2017 | Crofton | G06F 21/64 |
| 2018/0063146 | A1 * | 3/2018 | Nakata | G06F 21/56 |
| 2021/0294878 | A1 | 9/2021 | Buchanan et al. | |

FOREIGN PATENT DOCUMENTS

| | | | | |
|---|---|---|---|---|
| WO | | 2007087141 A1 | 8/2007 | |
| WO | | WO-2007117582 A2 * | 10/2007 | H04W 12/12 |

OTHER PUBLICATIONS

"Appending an id to a list if not already present in the list", obtained online from <https://stackoverflow.com/questions/17370984/appending-an-id-to-a-list-if-not-already-present-in-the-list>, retrieved on Nov. 10, 2025. (Year: 2013).*

V. Roussev, "Hashing and Data Fingerprinting in Digital Forensics," in IEEE Security & Privacy, vol. 7, No. 2, pp. 49-55, Mar.-Apr. 2009 (Year: 2009).*

Deepanshu Bhalla, "SAS SQL: Comparing Two Tables", 2015, Obtained online from <https://web.archive.org/web/20151208233324/https://www.listendata.com/2015/04/sas-sqi-comparing-two-tables.html>, retrieved on Apr. 27, 2023, 4 pages.

Great Britain Search Report issued in counterpart GB Application No. GB1705334.9 dated Oct. 2, 2017 (two (2) pages).

International Search Report and Written Opinion for PCT/GB2018/050617; International Filing Date Mar. 12, 2018; Date of Mailing: Aug. 4, 2018; 10 pages.

Frei, Stefan, "IP Address & Range Calculator"; obtained on line from: https://techzoom.net/lab/ip-address-calculator/; 3 pages; retrieved on Dec. 28, 2021.

* cited by examiner (a)

(b)

METHOD FOR REDUCING FALSE-POSITIVES FOR IDENTIFICATION OF DIGITAL CONTENT

CROSS REFERENCE TO RELATED APPLICATIONS

This application is a continuation application of U.S. application Ser. No. 16/500,736, filed Oct. 3, 2019, which is a 35 U.S.C. § 371 U.S. national phase entry of International Application PCT/GB2018/050617, filed Mar. 12, 2018, which claims priority to GB 1705334.9, filed Apr. 3, 2017, the contents of each of which are incorporated by reference in their entirety herein for all purposes.

FIELD

The present invention relates to identifying digital content, and in particular to identifying digital content while preventing false positives.

BACKGROUND

Many areas of investigation require searching through data that may be of interest. One example of data that may be involved in an investigation is copyrighted material that may be suspected of having been obtained or reproduced illegally by a third party. Another example of data may be confidential files belonging to a first entity that may be suspected of having been obtained illegally by another entity, thereby necessitating that the location of such files be detected.

A further example of data is illegal files that may be sought as part of a digital forensic examination. A large percentage of investigations undertaken by law enforcement agencies (and other similar agencies) involve searching for particular data. This, in turn, may require that the law enforcement agencies keep a database of known illegal files or illegal content.

Yet a further example of data may be computer viruses or malware. Anti-virus detection systems are typically based on databases of known signatures of known computer viruses or malware applications.

Another exemplary situation is wherein a data owner or holder attempts to prevent data loss. This is particularly relevant for applications wherein data integrity and loss prevention is of importance.

In each of the above examples, it may be necessary to search through a significant body of data in order to detect particular digital content of interest. This may require significant resources and may take significant amounts of time, which for many applications is detrimental. For example, under certain circumstances, there may only be a very limited time available in which to detect content of interest.

A further problem is that some data or data elements may appear in both data of interest and data that may be safely ignored, thereby resulting in a significant number of false positives during searches. Checking for false positives is very time and resource consuming.

It is the aim of the present disclosure to at least address some of the above problems.

SUMMARY

In accordance with a first aspect of the invention, there is provided a method for identifying at least one digital content element, the digital content element forming a part of a set of digital content, the method comprising:

providing the digital content element;

comparing the digital content element with a first set of data provided by a combination of a second set of data and a third set of data; and if the digital content element is detected within the first set of data, then identifying the digital content element as known.

In accordance with a second aspect of the invention, there is provided a method for populating a second set of data and a third set of data usable in a method as set out above, the method comprising:

providing at least one set of population data, the at least one set of population data comprising a plurality of population data elements;

comparing each population data element with the third set of data;

if a population data element is not detected within the third set of data, then compare the population data element with the second set of data;

if a population data element is not detected within the second set of data, then adding the population data element to the second set of data; and if a population data element is detected within the second set of data, then adding the population data element to the third set of data.

In accordance with a third aspect of the invention, there is provided a method for populating a second set of data and a third set of data usable in a method as set out above, the method comprising:

providing at least one set of population data, the at least one set of population data comprising a plurality of population data elements;

comparing each population data element with the second set of data;

if a population data is not detected within the second set of data, then adding the population data element to the second set of data; and if a population data element is detected within the second set of data, then adding the population data element to the third set of data.

In accordance with a fourth aspect of the invention, there is provided a method for removing false positives from a set of digital content identified as known, the method comprising:

providing a fourth set of data identified as known according to the method as set out above, wherein the fourth set of data comprises misidentified digital content elements; and adding the misidentified digital content element to the third set of data.

In accordance with a fifth aspect of the invention, there is provided a computer program product containing one or more sequences of machine-readable instructions for implementing a method as set out above.

Further aspects, features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF EXEMPLARY EMBODIMENTS

The inventors have realized that it is possible to mitigate the number of false positives while maintaining a high search speed by comparing digital content of interest to known digital content of interest and known irrelevant or non-identifying digital content. This reduces the number of false positives due to non-identifying digital content while maintaining the speed and efficacy of the identification process.

Figure 1:
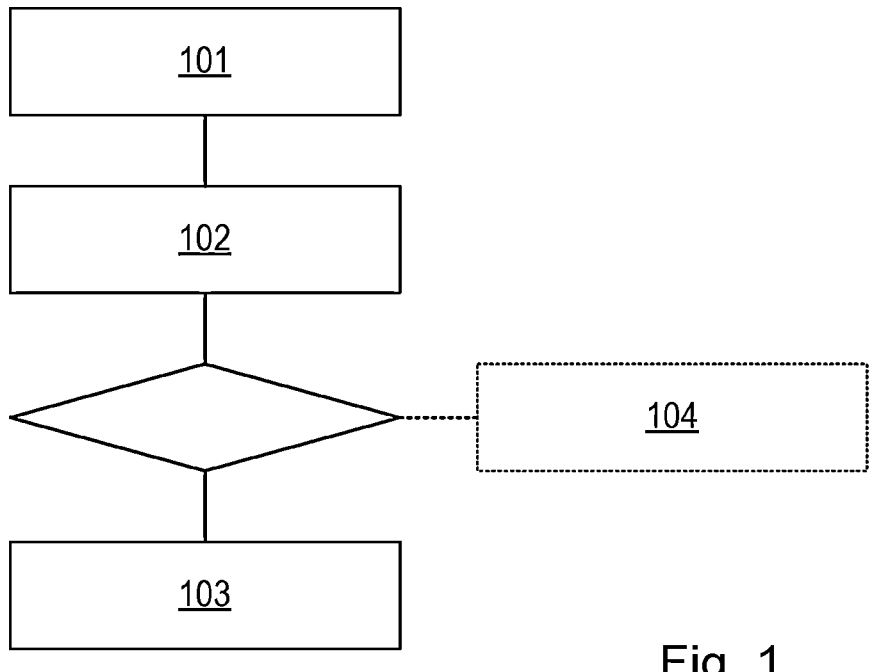
FIG. 1 shows a method for identifying a digital content element in accordance with a first embodiment of the invention.

An exemplary method will now be discussed with reference to FIG. 1.

In a first step 101, a digital content element is provided. The digital content element may have any suitable format or data structure of interest to a searching entity. In some examples, the digital content element is a data file. In other examples, the digital content element is a plurality of data files. In other examples, the digital content element is a fragment or portion of one or more data files. In an example, the digital content element has a fixed size. In another example, the digital content element has a variable size. In some examples, the digital content element is a representation of one or more original digital data files. In other examples, the digital content element is a representation of a fragment or portion of one or more original data files.

Purely for exemplary purposes, the digital content element may be a particular data file (or portion of a data file) that is of interest to a searching entity, such as (but not limited to): confidential data owned by the searching entity that may have been illegally obtained by a third party; or contraband data that may have been obtained illegally.

In a second step 102, the digital content element is compared with a first set of data provided by a combination of a second set of data and a third set of data.

The first set of data may have any suitable form so as to provide a suitable combination of the second set of data and the third set of data. The combination may be provided in a suitable manner, and it will be appreciated that many specific implementations of the combination may be envisaged within the scope of the present disclosure. A number of exemplary implementations of the combination, as well as the first set of data, will be discussed in further detail below for purely illustrative purposes only.

The second set of data and the third set of data may have any suitable format or data structure. In some examples, the second set of data and the third set of data may comprise (without limitation): a record of the set of digital data; a database of one or more digital content elements; a database comprising representations of at least one data file or a fragment of at least one data file (e.g. a hash representation or a locality-sensitive hash representation); a data structure representing at least data file or portion of at least one data file or a representation of at least one data file or portion of at least one data file (e.g. an approximate set membership testing algorithm structure). It will be appreciated that the term representation is used to refer to any suitable type of function that can be used to map digital content to any suitable data structure.

Specific examples of data formats or structures that may be employed include (but are not limited to): original digital content elements (such as a data block of a certain size); a representation of a digital content element (such as a hash value representing a data block or file (or fragment or portion thereof)); a data structure that represents a digital content element or a representation of a digital content element (such as a bloom filter, cuckoo filter, another approximate set membership testing algorithm or filter structure); or a database containing one or more of the previously mentioned structures (i.e. original digital content elements, representations of original digital content elements or an approximate set membership testing algorithm).

The step of comparing may be performed in any suitable fashion. It will be realized that a number of specific implementations of the comparing step may be envisaged. It will be appreciated that, as part of the comparing step, one or more suitable operations may be performed on one or more of the first set of data, second set of data or third set of data.

In a third step 103, the digital content element is identified as known if the digital content element is detected within the first set of data. In an example, the first set of data is a collection of known digital content elements that are of interest to a searching entity (such as, but not limited to, contraband digital content elements or digital content elements owned by or represented by the searching entity). As described above, the known digital content elements may be provided in any suitable fashion (whether in their entirety, as a representation or as another type of structure).

It will be appreciated that the identifying step may be implemented in a number of specific ways. In some examples, the specific implementation of the identifying step is directly dependent on the preceding comparing step.

In some examples, in an optional step 104, one or more appropriate operations may be carried out on the digital content element if the digital content element is not detected within the first set of data. In an example, no additional operations are carried out.

A method comprising a first exemplary comparing step and a corresponding identifying step will now be discussed with reference to FIG. 2.

In a first step 201, a digital content element is provided. The digital content element may be provided in any suitable fashion and may have any suitable format. In an example, the digital content element is provided in a manner substantially identical to that described with reference to FIG. 1 above.

In a second step 202, the digital content element is compared with the second set of data. The second set of data may have any suitable format, and may comprise or represent any relevant data or data types. In an example, the second set of data comprises data that is of interest to a searching entity. In another example, the second set of data comprises a representation of data that is of interest to a searching entity. Data that may be of interest includes, but is not limited to, contraband data, confidential data or otherwise protected data.

If the digital content element is not detected within the second set of data, the digital content element is ignored. If the digital content element is not detected within the second set of data, the digital content is not of relevance to the searching entity, and may therefore be safely ignored. In some examples, one or more specific operations may optionally be carried out as part of an ignore step 205.

If the digital content element is detected within the second set of data, the digital content element is, in a second step 203, compared with the third set of data. The third set of data may have any suitable format, and may comprise or represent any relevant data or data types. In an example, the third set of data comprises data that is irrelevant to a searching entity. In another example, the third set of data comprises representations of data that is irrelevant to a searching entity. In particular examples, the third set of data comprises non-identifying data. In a specific example, the third set of data comprises non-unique data (e.g. data that is repeated in each instance of a particular data type). Examples of non-unique data include, but are not limited to: data relating to file structures or meta data.

If the digital content is not detected within the third set of data, the digital content element is identified as known 204. As described above, this step may be performed in any suitable fashion. In this example, the step of identifying comprises identifying the digital content element as known if: the digital content element is detected within the second set of data; and if the digital content element is not detected within the third set of data. In such a situation, the digital content element has been determined to be of interest to the searching entity, and has been determined to not be a non-identifying element.

If the digital content element is detected within the third set of data, the digital content element is ignored 206. In this situation, the digital content element has been identified as relevant to the searching entity, but its inclusion in the non-identifying set of data means that it should be ignored.

A method with a second exemplary comparing step and corresponding identifying step will now be discussed with reference to FIG. 3.

In a first step 301, a digital content element is provided. The digital content element may be provided in any suitable fashion and may have any suitable format. In an example, the digital content element is provided in a manner substantially identical to that described with reference to FIG. 1 above.

In a second step 302, the digital content element is compared with the third set of data. The third set of data may have any suitable format, and may comprise or represent any relevant data or data types as described above.

Figure 2:
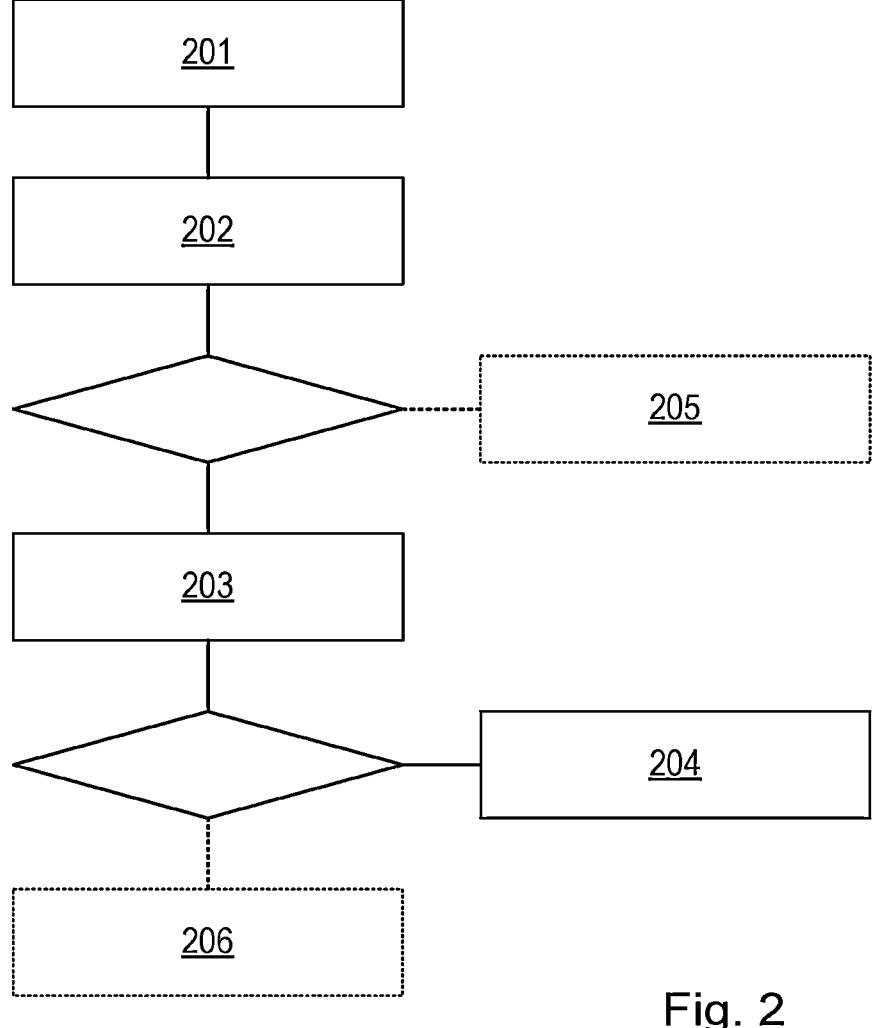
FIG. 2 illustrates a method for identifying a digital content element in accordance with a second embodiment of the invention.
Figure 3:
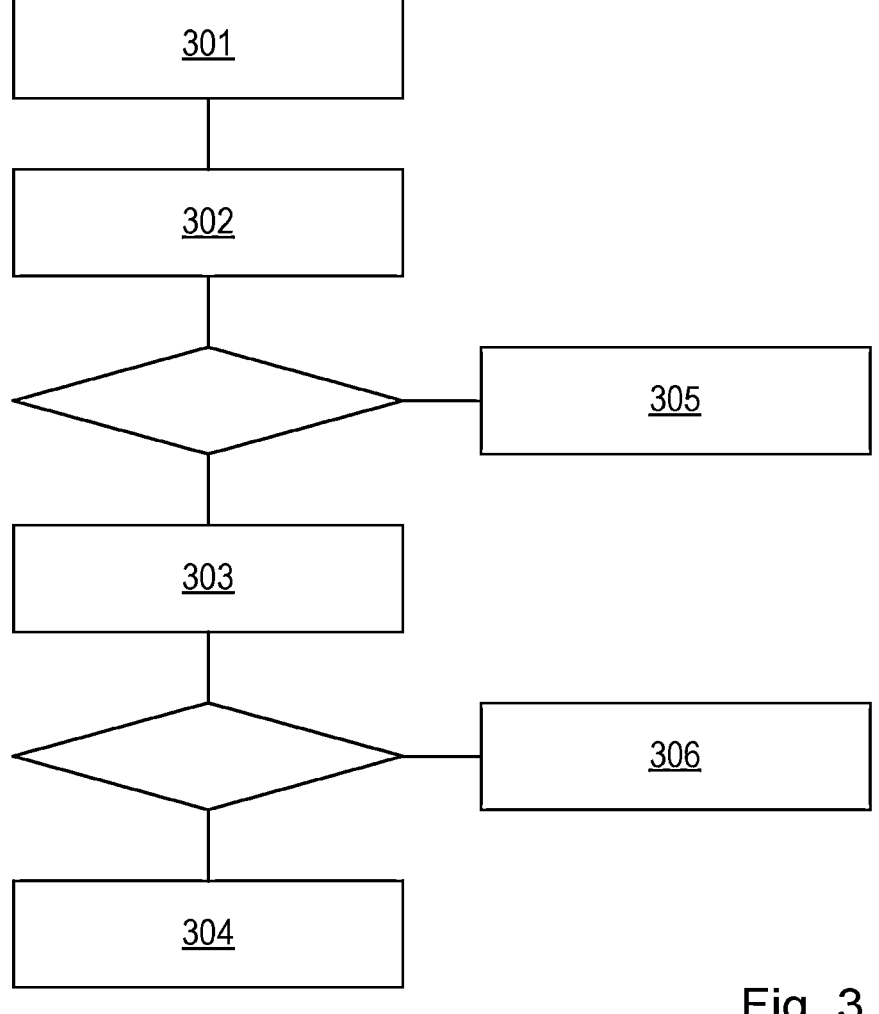
FIG. 3 shows a method for identifying a digital content element in accordance with a third embodiment of the invention.

It will be appreciated that the second step of the method of FIG. 3 is substantially identical to the third step of the method of FIG. 2. Under certain circumstances, it may be more efficient to determine whether the digital content element is non-identifying before determining whether the digital content element is relevant to the searching entity. Examples of these situations include (but are not limited to): if the number of elements in the second set of data is large; or if the number of elements in the third set of data is small. In either of these exemplary situations, performing the comparison with the third set of data before the comparison with the second step of data may require fewer individual comparison operations to be carried out, thereby rendering this approach more resource and/or time efficient than the one described above with reference to FIG. 2.

If the digital content element is not detected within the third set of data, the digital content element is then, in a third step 303, compared with the second set of data. The second set of data may have any suitable format, and may comprise or represent any relevant data or data types. In an example, the second set of data comprises data that is of interest to a searching entity as described above. This step may be performed in any suitable fashion. In an example, the third step 303 is substantially identical to the second step 202 described with reference to FIG. 2.

If the digital content element is detected within the third set of data, the digital content element is ignored 305. In some examples, one or more specific operations may optionally be carried out as part of an ignore step 305.

In a fourth step 304, the digital content element is identified as known if: the digital content element is not detected within the third set of data; and if the digital content element is detected within the second set of data.

If the digital content element is not detected within the second set of data, the digital content element is ignored 306. In some examples, one or more specific operations may optionally be carried out as part of an ignore step 306.

Figure 4:
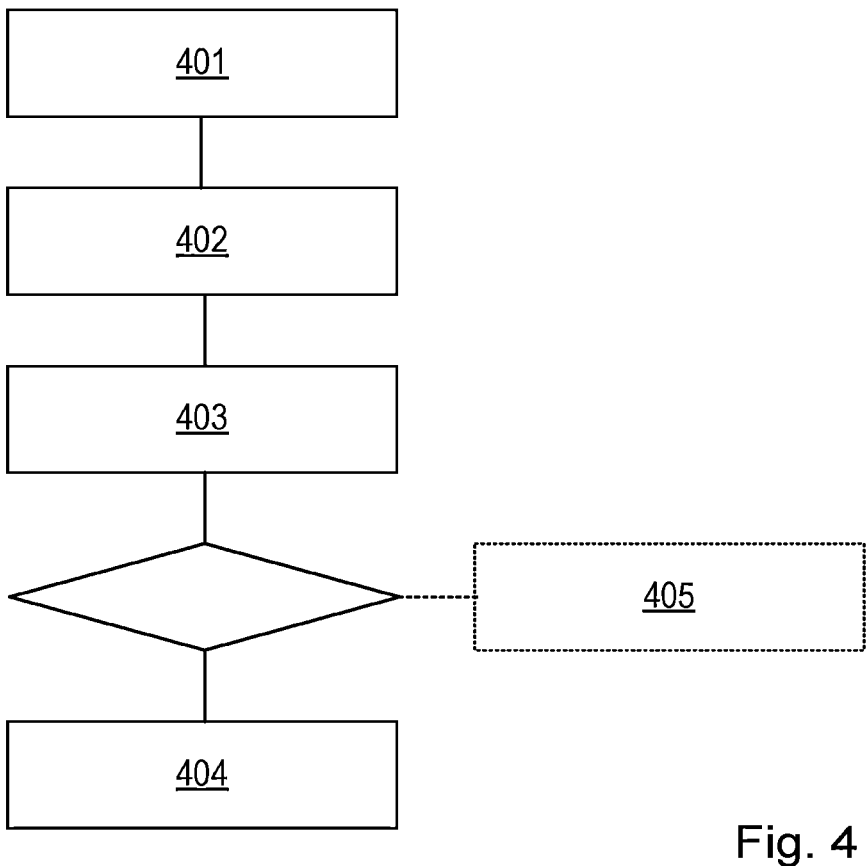
FIG. 4 illustrates a method for identifying a digital content element in accordance with a fourth embodiment of the invention.

A method with a third exemplary comparing step and corresponding identifying step will now be discussed with reference to FIG. 4.

In a first step 401, a digital content element is provided. The digital content element may be provided in any suitable fashion. In an example, this step is substantially identical to the corresponding steps of any of the methods shown in FIGS. 1-3.

In a second step 402, a first set of data is created by subtracting the third set of data from the second set of data. The subtracting step may be implemented in any suitable fashion. In some examples, the particular implementation of the subtracting step may be directly dependent on the sets of data to be subtracted. An exemplary implementation of the subtraction step will be discussed in further detail below.

It will be appreciated that many implementations of the subtraction step may be envisaged within the scope of the present disclosure. It will further be appreciated that, although the subtraction step is described as part of the exemplary method, it may, in principle be performed prior to the provision step and at a location remote therefrom.

In a third step 403, the digital content element is compared with the first set of data.

In a fourth step 404, the digital content element is identified as known if the digital content element is detected within the first set of data.

Figure 5:
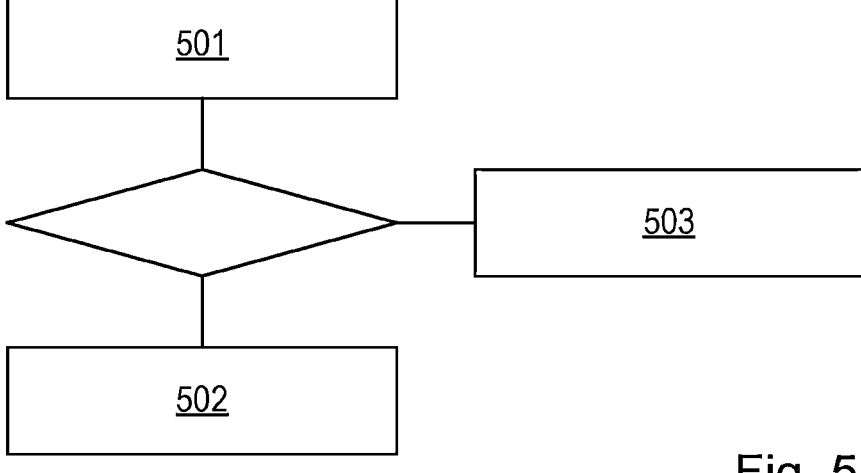
FIG. 5 illustrates an exemplary method of a step of creating a first set of data such as may be used in the method of FIG. 4.

An exemplary implementation of the subtracting step will now be discussed with reference to FIG. 5. In this example, both of the second and third sets of data comprise a plurality of data elements. However, it will be appreciated that the first set of data may have any of a number of suitable formats as described above.

As described above, the subtracting step may be performed as part of the method described above with reference to FIG. 4, or it may be performed prior to the method of FIG. 4 being performed. In some examples, the subtracting step is performed by a different entity than the searching entity, and the first set of data is provided to the searching entity. In other examples, the searching entity performs the subtracting step at a time prior to the provision step. It will be appreciated that a number of specific implementations of the subtracting step may be envisaged. It will further be appreciated that each of the specific implementations is dependent on the specific characteristics of the implementation as well as the intended properties of the implementation.

In a first step 501, each data element in the second set of data is compared with each element in the third set of data.

In a second step 502, if a specific data element of the second set of data is not detected within the third set of data, the data element of the second set of data is added to the first set of data.

In an optional third step 503, if a specific data element of the second set of data is detected within the third set of data, the specific data element is ignored. In some examples, additional operations are carried out.

It will be appreciated that the term "digital content element", as used in the preceding examples (as well as in the examples that follow), may be used to refer to a number of specific digital content types and digital content formats. It will be appreciated that the skilled person would easily be able to envisage a number of specific content types and formats to which the following examples may be readily applied. The term "digital content element" is, therefore, not to be interpreted as being limiting.

Purely for exemplary purposes, a number of digital content types to which the examples may be applied will now be discussed. In some examples, the set of digital content may comprise at least one data file, and the digital content element may comprise a fragment or portion of the data file. In some examples, the digital content element is defined in the structure of the set of digital content. In some examples, the digital content element is a block having a fixed size. In an example, the block corresponds to a network packet. In another example, the block corresponds to a payload portion of a network packet. In other examples, the block corresponds to one of: a memory block; a disk storage block; a disk storage sector; or a block comprising at least at least one data file.

In some examples, the set of digital content and/or the digital content elements are encoded in a suitable fashion. In an example, the digital content element is encoded by way of a hashing function. In another example, the digital content element is encoded by way of a locality-sensitive hashing function. In yet another example, the digital content element is functionally encoded.

Similarly, it is possible for either or all of the first set of data, second set of data or the third set of data to be encoded in a suitable manner. In some examples, the first set of data, second set of data and the third set of data are encoded in an identical manner to the digital content element. In other examples, the first set of data, second set of data and the third set of data are encoded in a different manner than the digital content element. In a specific example, at least one of the first set of data, second set of data or the third set of data has been encoded by way of a hashing function.

In the above examples, it has been assumed that all digital content elements have been correctly identified as known. However, under certain circumstances, subsequent to being identified as known, it may turn out that certain digital content elements have been misidentified. For example, a digital content element may have been identified as known, which under subsequent scrutiny may turn out erroneous.

Misidentification of digital content may for example result in so-called "false positives", which reduces the overall accuracy, speed and trustworthiness of the identification method. This is particularly important for applications wherein the identification accuracy and/or speed are important. Misidentified digital content elements may be identified at any suitable time or by any suitable mechanism. In some examples, an operator may identify misidentified elements independently of and remotely from the present methods, and feed them back via a separate feedback mechanism. In other examples, an end user of identified digital content may identify misidentified digital content elements and feed these back to the operator.

In some examples, the exemplary methods described above comprise additional steps in order to reduce the number of misidentified digital content elements. An exemplary set of misidentification mitigation steps will now be discussed with reference to FIGS. 6(*a*) and 6(*b*).

Figure 6:
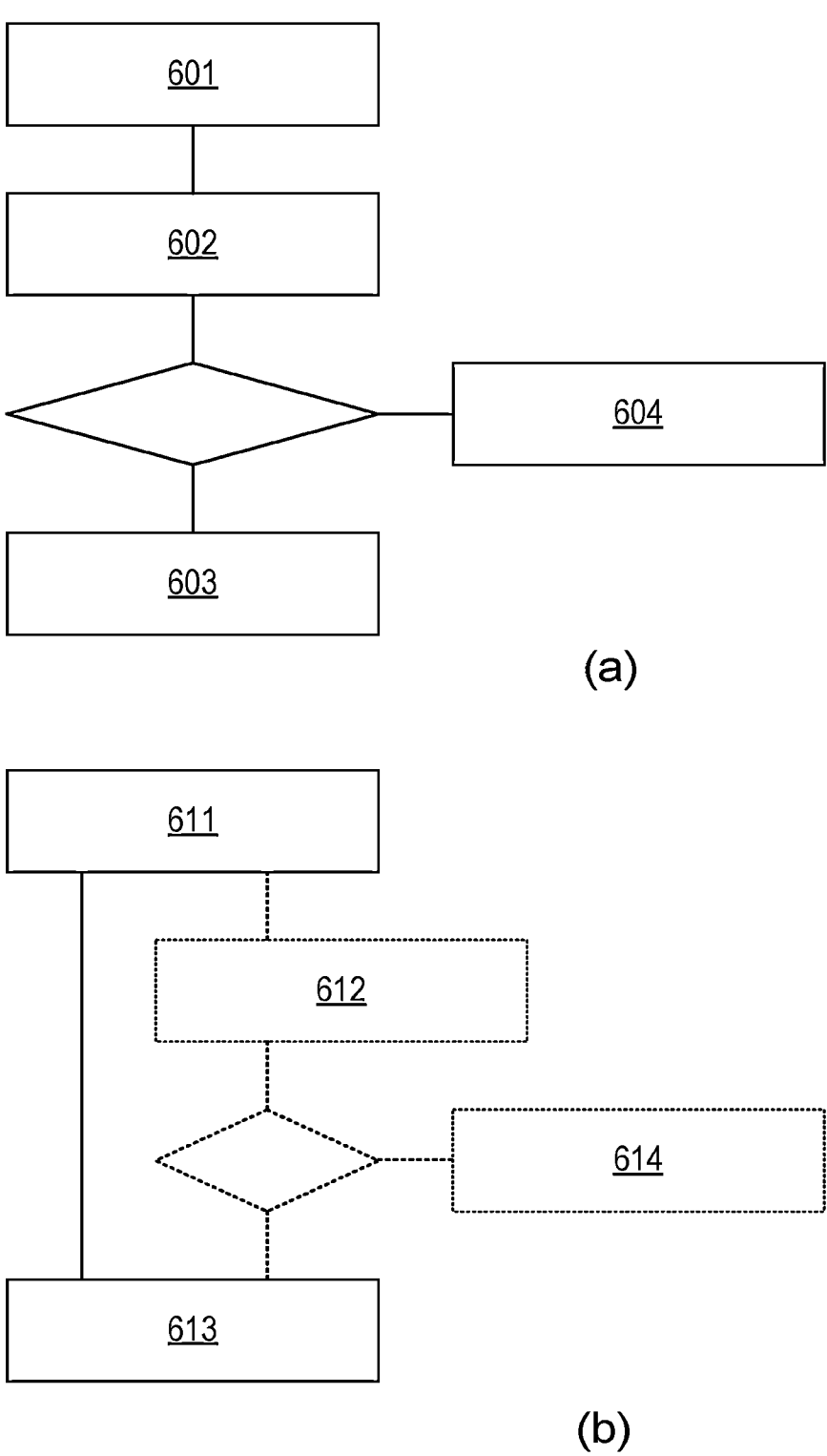
FIG. 6 shows a method for mitigating misidentification.

In a first mitigation step 601 of the first exemplary set of misidentification mitigation steps (as shown in FIG. 6(*a*), a fourth set of data is received, wherein the fourth set of data comprises misidentified digital content elements. The misidentified digital content elements may in some examples comprise digital content elements that have been determined to have been misidentified. The fourth set of data may have any suitable format or data structure. In an example, the fourth set of data has a format or data structure substantially identical to that of at least one of the first set of data, second set of data or third set of data.

In a second mitigation step 602, the fourth set of data is compared with the second set of data.

If a misidentified digital content element is detected within the second set of data, the misidentified digital content element, in a third mitigation step 603, is added to the third set of data.

A second exemplary set of misidentification mitigation steps are shown in FIG. 6(*b*). In a first mitigation step 611, a fourth set of data is received similarly to step 601 described above.

In an optional second mitigation step 612, the fourth set of data is compared to the third set of data. If the fourth set of data is not detected within the third set of data, the method continues with mitigation step 613 described below. If the fourth set of data is detected within the third set of data, the fourth set of data is ignored in a further optional mitigation step 614.

In a third mitigation step 613, the fourth set of data is added to the third set of data. In some instances, the second set of data and third set of data are pre-populated. However, in other situations, it is necessary or desirable to populate one or both of the second set of data and third set of data. In some examples, this could be because the searching entity becomes aware of additional data of interest or additional non-identifying data. It will be appreciated that the population of the second set of data and/or the third set of data may be performed by an entity different to the searching entity. This could, for example, be relevant in situations in which the second set of data and third set of data comprise representations of confidential data.

Figure 7:
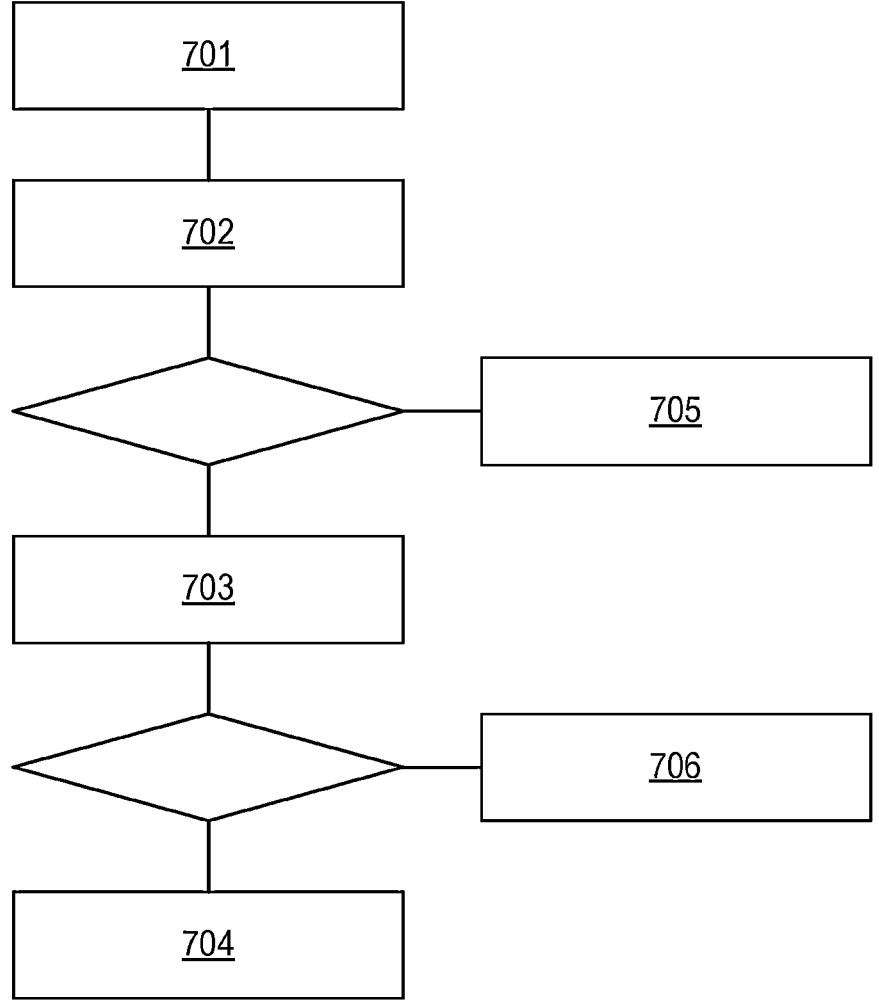
FIG. 7 illustrates a method for populating a set of data that may be used to identify a digital content element.

A first exemplary method for populating a second set of data and a third set of data usable in any of the examples described above will now be discussed with reference to FIG. 7. The population data may represent data that may be of relevant to a searching entity (or other entities). As a non-limiting example, the population data could represent newly discovered contraband data or confidential data illegally obtained.

In a first step 701, at least one set of population data is provided, the at least one set of population data comprising a plurality of population data elements. The population data may be provided in any suitable form, and may have any suitable format or structure. In some examples, the population data comprises a single file. In other examples, the population data comprises a plurality of files.

In a second step 702, each population data element is compared with the third set of data.

If a population data element is not detected within the third set of data, the population data element, in a third step 703, is compared with the second set of data.

If a population data element is not detected within the second set of data, the population data element is, in a fourth step 702, added to the second set of data.

If, by contrast, a population data element is detected within the second set of data, the population data element is, in a fifth step 705, added to the third set of data.

Figures 8, 9:
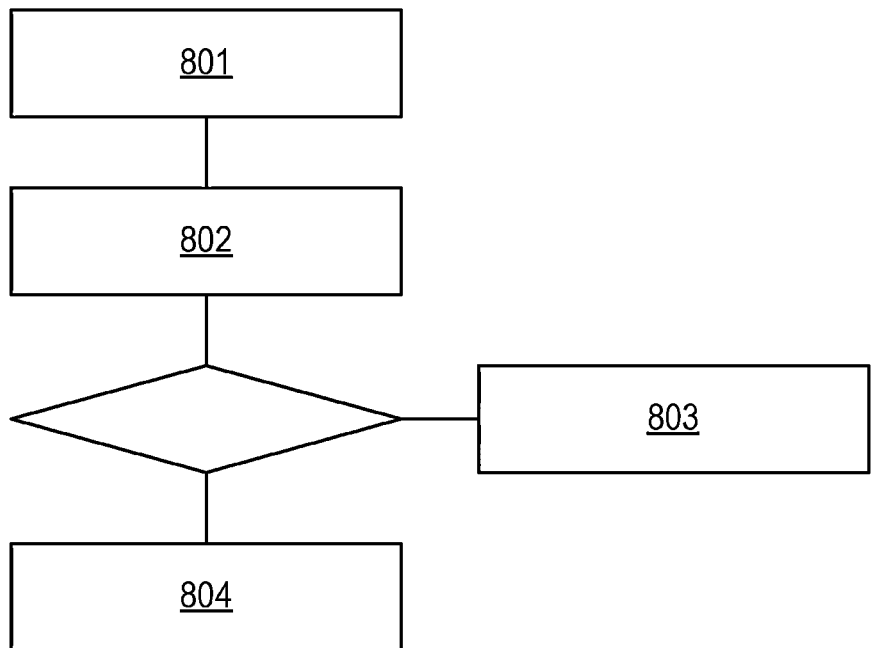
FIG. 8 illustrates a sub-method that may be implemented in the method of FIG. 7.
FIG. 9 illustrates a second sub-method that may be implemented in the method of FIG. 7 or FIG. 8.

A second exemplary method for populating a second set of data and a third set of data usable in any of the above examples will now be discussed with reference to FIG. 8.

In a first step 801, at least one set of population data is provided, the at least one set of population data comprising a plurality of population data elements.

In a second step 802, each population data element is compared with the second set of data.

If a population data element is not detected within the second set of data, the population data element is, in a third step 803, added to the second set of data.

If a population data element is detected within the second set of data, the population data element is, in a fourth step 804, added to the third set of data.

The above-described providing steps may be performed in any suitable manner and in any suitable order. It will be appreciated that, in some examples, one or more of the steps described with reference to FIG. 7 may comprise one or several sub-steps. In some examples, it is desirable or necessary to determine whether the population data is already known before performing the comparison step. For example, it may be desirable or necessary to compare each of the population data elements with the second set of data (e.g. described in the second step 802) before performing any or either of the third step 803 or the fourth step 804. It will be appreciated that, in general, a determination step (e.g. the exemplary determination described in the following) may be performed at any suitable time, and for any suitable portion of the population data (e.g. one, several or all of the population data elements).

An exemplary providing step that comprises a plurality of sub-steps that will now be described with reference to FIG. 9. In this example, in a first sub-step 901, the at least one set of population data is compared with a population database, the population database comprising at least one known sets of population data.

If a set of population data is not detected in the population database, the set of population data is, in a second sub-step 902, added to the population database. Additionally, in some examples, additional processing steps may be performed. In an example, the population data may be processed as described with reference to FIG. 7 or 8 above.

If a set of population data is detected in the population database, the set of population data is, in a third sub-step 903, ignored.

It will be appreciated that the skilled person may envisage many suitable implementations of the above-described methods.

The descriptions above are intended to be illustrative, not limiting. Thus, it will be apparent to one skilled in the art that modifications may be made to the invention as described without departing from the scope of the claims set out below.

The invention claimed is:

1. A method for identifying at least one digital content element, the digital content element forming a part of a set of digital content, the method comprising:
    providing the digital content element;
    comparing the digital content element with a first set of data provided by a combination of a second set of data and a third set of data, wherein the second set of data represents known data of interest to a searching entity and wherein the third set of data represents known non-identifying digital content elements including one or more non-unique digital content elements relating to a file structure or meta data;
    if the digital content element is detected within the first set of data, then identifying the digital content element as digital content of interest; and
    adjusting the second set of data or the third set of data to include one or more additional data elements based on determining whether the one or more additional data elements are not already included in either of the second set of data and the third set of data.

2. The method according to claim 1, wherein the step of comparing comprises:
    comparing the digital content element with the second set of data; and
    if the digital content element is detected within the second set of data, then comparing the digital content element with the third set of data, and
    wherein the step of identifying comprises:
    if the digital content element is detected within the second set of data and if the digital content element is not detected within the third set of data, then identifying the digital content element as digital content of interest.

3. The method according to claim 1, wherein the step of comparing comprises:
    comparing the digital content element with the third set of data; and
    if the digital content element is not detected within the third set of data, then comparing the digital content element with the second set of data, and wherein the step of identifying comprises:
    if the digital content element is detected within the second set of data and if the digital content is not detected within the third set of data, then identifying the digital content as digital content of interest.

4. The method according to claim 1, wherein the step of comparing comprises:
    creating the first set of data by subtracting the third set of data from the second set of data; and
    comparing the digital content element with the first set of data, and wherein the step of identifying comprises:
    if the digital content element is detected within the first set of data, then identifying the digital content element as digital content of interest.

5. The method according to claim 1, wherein creating the first set of data comprises:
    comparing each element in the second set of data with each element in the third set of data; and
    if an element of the second set of data is not detected within the third set of data, then adding the element to the first set of data.

6. The method according to claim 1, wherein the set of digital content comprises:
    at least one data file, and wherein the digital content element is a fragment of the data file.

7. The method according to claim 1, wherein the digital content element is defined in the structure of the set of digital content.

8. The method according to claim 1, wherein the digital content element is a block.

9. The method according to claim 8, wherein the block corresponds to a network packet or a payload portion of a network packet.

10. The method according to claim 8, wherein the block corresponds to one of: a memory block; a disk storage; a disk storage sector; or a block comprising at least one data file.

11. The method according to claim 8, wherein the block has a fixed size.

12. The method according to claim 1, wherein the digital content element has been encoded by the way of one of: a hashing function; or a locality-sensitive hashing function.

13. The method according to claim 1, wherein at least one of the second set of data or the third set of data have been encoded by way of a hashing function.

14. The method according to claim 1, wherein the second set of data and the third set of data is one of: a cuckoo filter; or a bloom filter.

15. The method according to claim 1, further comprising: receiving a fourth set of data identified as known, wherein the fourth set of data comprises misidentified digital content elements;

comparing the fourth set of data with the second set of data; and if a misidentified digital content element is detected within the second set of data, adding the misidentified digital content element to the third set of data.

16. The method according to claim 1, wherein at least one of the second set of data and the third set of data comprises a plurality of respective subsets of data.

17. The method of claim 1, wherein the one or more additional data elements comprise at least one set of population data comprising a plurality of population data elements, and adjusting the second set of data or the third set of data comprises:

comparing each population data element with the third set of data;

if a population data element is not detected within the third set of data, then compare the population data element with the second set of data;

if a population data element is not detected within the second set of data, then adding the population data element of the second set of data;

and if a population data element is detected within the second set of data, then adding the population data element to the third set of data.

18. The method according to claim 17, wherein the step of providing comprises:

comparing the at least one set of population data with a population database, the population database comprising at least one known sets of population data;

if a set of population data is not detected in the population database, then adding the set of population data to the population database;

and if a set of population data is detected in the population database, then ignoring the set of population data.

19. The method according to claim 18, wherein the population database comprises at least one representation of at least one known sets of population data, and wherein the step of comparing comprises:

providing a representation of each of the at least one set of population data; and comparing the representation of each of the at least one set of population data with each of the at least one representation of the at least one known sets of population data.

20. The method of claim 1, wherein the one or more additional data elements comprise at least one set of population data comprising a plurality of population data elements, and adjusting the second set of data or the third set of data comprises:

comparing each population data element with the second set of data;

if a population data element is not detected within the second set of data, then adding the population data element to the second set of data; and if a population data element is detected within the second set of data, then adding the population data element to the third set of data.

* * * * *